(12) United States Patent
Sugimura et al.

(10) Patent No.: US 9,381,801 B2
(45) Date of Patent: Jul. 5, 2016

(54) CONTROL DEVICE FOR HYBRID VEHICLE

(71) Applicants: Toshio Sugimura, Nagoya (JP); Seiji Kuwahara, Toyota (JP); Takahiko Tsutsumi, Nisshin (JP); Koki Minamikawa, Nagoya (JP); Shun Sato, Toyota (JP)

(72) Inventors: Toshio Sugimura, Nagoya (JP); Seiji Kuwahara, Toyota (JP); Takahiko Tsutsumi, Nisshin (JP); Koki Minamikawa, Nagoya (JP); Shun Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/654,399

(22) PCT Filed: Dec. 26, 2012

(86) PCT No.: PCT/JP2012/083750
§ 371 (c)(1),
(2) Date: Jun. 19, 2015

(87) PCT Pub. No.: WO2014/102946
PCT Pub. Date: Jul. 3, 2014

(65) Prior Publication Data
US 2015/0336570 A1  Nov. 26, 2015

(51) Int. Cl.
*B60W 20/00* (2016.01)
*B60K 6/547* (2007.10)
*B60W 10/08* (2006.01)
(Continued)

(52) U.S. Cl.
CPC . *B60K 6/547* (2013.01); *B60K 6/48* (2013.01); *B60K 6/54* (2013.01); *B60W 10/02* (2013.01); *B60W 10/06* (2013.01); *B60W 10/08* (2013.01); *B60W 10/10* (2013.01); *B60W 20/00* (2013.01);
(Continued)

(58) Field of Classification Search
CPC ..... B60W 10/02; B60W 10/08; B60W 20/00; B60W 10/06; Y02T 10/06
See application file for complete search history.

(56) References Cited

U.S. PATENT DOCUMENTS

2004/0147366 A1* 7/2004 Aoki ................. B60K 6/44
477/6
2007/0275819 A1* 11/2007 Hirata ................ B60K 6/365
477/5
(Continued)

FOREIGN PATENT DOCUMENTS

JP H11-285107 A 10/1999
JP 2005-121089 A 5/2005
JP 2011-016390 A 1/2011

*Primary Examiner* — Thomas Tarcza
*Assistant Examiner* — Alex C Dunn
(74) *Attorney, Agent, or Firm* — Oliff PLC

(57) ABSTRACT

Control device of hybrid vehicle including an engine connected via a clutch to power transmission path and a rotator acting at least as an electric motor, hybrid vehicle being configured to execute an engine running mode in which clutch is engaged to use at least engine as a drive force source for running and a motor running mode in which clutch is released to use rotator as drive force source for running, control device putting clutch into slip engagement to crank and start engine before clutch is completely engaged at time of switching to engine running mode during stop of engine with clutch released, control device of hybrid vehicle, when clutch temperature reaches predefined value at time of switching to the engine running mode, releasing clutch and causing rotator to generate drive force for running while controlling rotation speed of engine to synchronize rotation speeds before and after clutch.

2 Claims, 4 Drawing Sheets

(51) Int. Cl.
*B60K 6/48* (2007.10)
*B60W 10/02* (2006.01)
*B60W 10/06* (2006.01)
*B60K 6/54* (2007.10)
*B60W 10/10* (2012.01)

(52) U.S. Cl.
CPC ...... *B60W 20/40* (2013.01); *B60W 2510/0291* (2013.01); *B60W 2710/021* (2013.01); *B60W 2710/025* (2013.01); *B60W 2710/0644* (2013.01); *B60W 2710/081* (2013.01); *Y02T 10/6221* (2013.01); *Y10S 903/93* (2013.01)

(56) References Cited

U.S. PATENT DOCUMENTS

| | | | |
|---|---|---|---|
| 2010/0248893 A1* | 9/2010 | Shimanaka | B60K 6/48 477/5 |
| 2013/0151057 A1* | 6/2013 | Matsubara | B60K 6/445 701/22 |
| 2014/0088813 A1* | 3/2014 | Kobayashi | B60L 15/2045 701/22 |
| 2014/0162841 A1* | 6/2014 | Kobayashi | B60K 6/48 477/5 |

* cited by examiner

FIG.2

| RUNNING MODE | ENGINE 12 | MG | K0 CLUTCH 34 |
|---|---|---|---|
| ENGINE RUNNING | ○ | △(ASSIST) | ○ |
| MOTOR RUNNING | × | ○ | × |

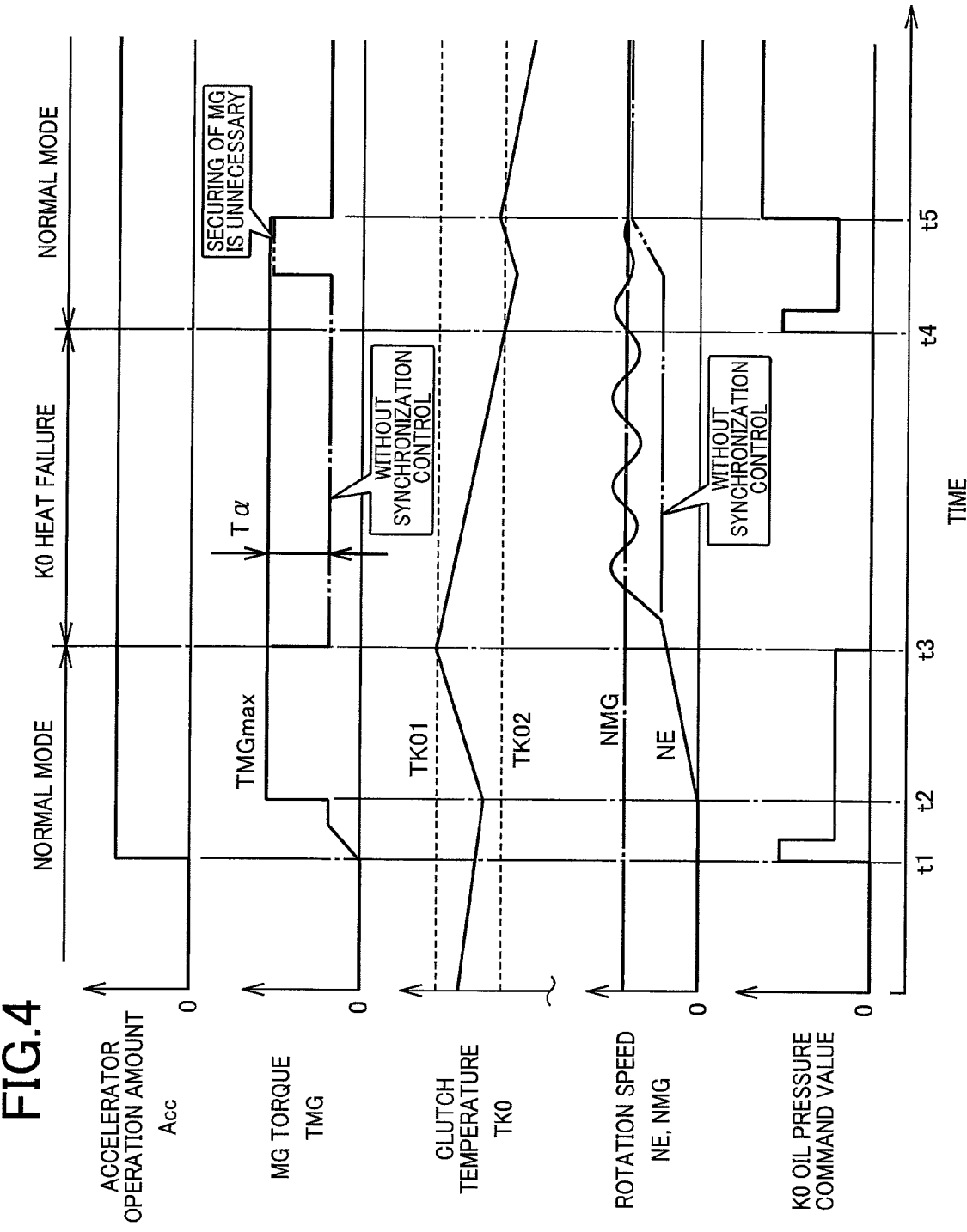

CONTROL DEVICE FOR HYBRID VEHICLE

TECHNICAL FIELD

The present invention relates to a control device of a hybrid vehicle and particularly to the control when a clutch is slip-engaged to crank and start an engine for switching to an engine running mode.

BACKGROUND ART

A hybrid vehicle is known (a) that includes an engine connected via a clutch to a power transmission path and a rotator acting at least as an electric motor and (b) that is capable of an engine running mode in which the clutch is engaged to use at least the engine as a drive force source for running and a motor running mode in which the clutch is released to use the rotator as the drive force source for running (see Patent Document 1). When such a hybrid vehicle is switched to the engine running mode during stop of the engine with the clutch released, the clutch is typically slip-engaged to crank and start the engine before the clutch is completely engaged.

PRIOR ART DOCUMENT

Patent Document

Patent Document 1: Japanese Laid-Open Patent Publication No. 11-285107

SUMMARY OF THE INVENTION

Problem to be Solved by the Invention

If a clutch is slip-engaged to crank an engine in this way, a clutch temperature is increased by heat generation due to friction and, therefore, a friction material etc. may be damaged by overheating. In this regard, although still unknown, it is conceivable that when the clutch temperature exceeds a predetermined temperature (such as a thermal limitation), the clutch is forcibly released to cause a rotator to generate a drive force for running and that when the temperature drops, the clutch is engaged again to make a shift to the engine running mode. In this case, since a shock (drive force variation) occurs due to inertia of the engine when the clutch is engaged, this must be compensated by a torque of the rotator, and the torque of the rotator is limited by a compensation torque during running in a clutch release state in preparation for the clutch engagement after the temperature drop. Since an engine torque cannot be utilized and the torque of the rotator is limited at this point, a driver may have a feeling of strangeness because of an insufficient drive force.

The present invention was conceived in view of the situations and it is therefore an object of the present invention to prevent a driver from having a feeling of strangeness because of an insufficient drive force when a switching to an engine running mode is performed such that the clutch is forcibly released due to an increase in clutch temperature to cause a rotator to generate a drive force for running and that when the temperature drops, the clutch is engaged again to make a shift to the engine running mode.

Means for Solving the Problem

To achieve the object, the first aspect of the invention provides a control device of a hybrid vehicle including (a) an engine connected via a clutch to a power transmission path and a rotator acting at least as an electric motor, the hybrid vehicle being configured to execute (b) an engine running mode in which the clutch is engaged to use at least the engine as a drive force source for running and a motor running mode in which the clutch is released to use the rotator as the drive force source for running, (c) the control device putting the clutch into slip engagement to crank and start the engine before the clutch is completely engaged at the time of switching to the engine running mode during stop of the engine with the clutch released, (d) the control device of the hybrid vehicle, when a clutch temperature reaches a predefined value at the time of switching to the engine running mode, releasing the clutch and causing the rotator to generate a drive force for running while controlling a rotation speed of the engine to synchronize rotation speeds before and after the clutch.

The second aspect of the invention provides the control device of a hybrid vehicle recited in the first aspect of the invention, wherein (a) the engine is directly coupled via the clutch to the rotator, and wherein (b) to synchronize the rotation speeds before and after the clutch, a shifting is performed in a shifting portion disposed in the power transmission path to make a rotation speed of the rotator that is a rotation speed on the power transmission path side of the clutch equal to an idle rotation speed of the engine while the engine is controlled such that a target rotation speed of the engine is the rotation speed of the rotator after the shifting.

Effects of the Invention

When the clutch temperature reaches the predefined value and the clutch is released at the time of switching to the engine running mode, the control device of the hybrid vehicle as described above controls the rotation speed of the engine such that the rotation speeds before and after the clutch are synchronized and, therefore, the shock (drive force variation) is reduced when the clutch is engaged for the shift to the engine running mode after the temperature drop. This eliminates or reduces the need for torque compensation at the time of clutch engagement and, when the drive force is generated by the rotator for running, limitation of a torque for the torque compensation is eliminated or reduced. Therefore, a driver is prevented from having a feeling of strangeness because of an insufficient drive force.

In the second aspect of the invention, since the engine and the rotator are directly coupled via the clutch, and a shifting is performed in the shifting portion to make the rotation speed of the rotator equal to the idle rotation speed of the engine while the engine is controlled such that the target rotation speed is the rotation speed of the rotator, that is, the engine is controlled such that the target rotation speed is the idle rotation speed, the engine rotation speed can highly accurately and surely be controlled by an idle rotation speed control device etc., and the shock at the time of clutch engagement can properly be reduced.

BRIEF DESCRIPTION OF THE DRAWINGS

FIG. 2 is a diagram for explaining the engine running mode and the motor running mode which are selected by a hybrid control means of FIG. 1.

FIG. 4 is an example of a time chart illustrating changes of portions in the case that, when the hybrid vehicle is switched to the engine running mode in accordance with the flowchart of FIG. 3, a K0 clutch is temporarily forcibly released due to a heat failure (thermal limitation).

MODE FOR CARRYING OUT THE INVENTION

Figure 1:
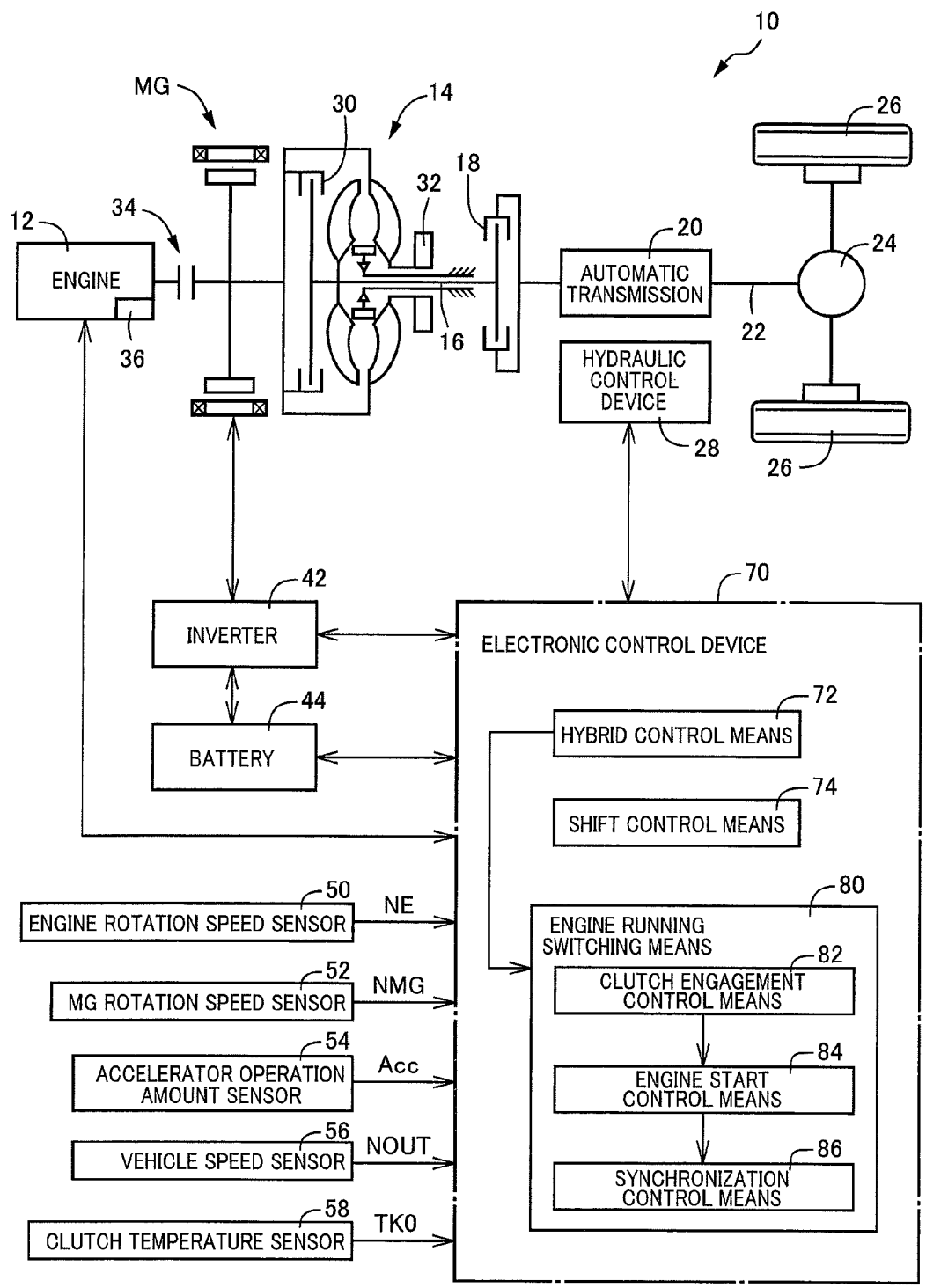
FIG. 1 is a diagram of a general configuration including a schematic of a hybrid vehicle to which the present invention is preferably applied, with a main portion of a control system.

Although a dry or wet single-plate or multi-plate friction clutch is preferably used as a clutch, the clutch can be another clutch capable of slip engagement (engagement transmitting a torque while permitting relative rotation) such as a magnetic powder clutch. An engine may be an internal combustion engine generating power from combustion of fuel and is directly connected via the clutch to a rotator, for example, and the disposition position of the rotator is appropriately defined within a range in which a drive force can be generated when the clutch is released. Although an electric motor can be used as the rotator, a motor generator having a function of an electric generator can also be employed.

In an engine running mode, at least the engine is used as a drive force source for running and, although only the engine may be used as the drive force source for running, both the engine and the rotator can be used as the drive force source for running. The switching to the engine running mode corresponds to the case of switching from a motor running mode to the engine running mode in association with an increase in demanded drive force by a driver, for example, or may be any switching to the engine running mode performed by cranking and starting the engine with the clutch slip-engaged from an engine stop state in which at least the clutch is released.

The clutch is controlled such that, for example, when a clutch temperature exceeds a predetermined engagement inhibition temperature dependent on a thermal limitation, the clutch is inhibited from being slip-engaged and is forcibly released and that the clutch is allowed to be slip-engaged or completely engaged when the clutch temperature becomes equal to or less than an engagement inhibition cancelation temperature. The clutch temperature may be detected by a temperature sensor or can be obtained from calculation by obtaining a heat generation amount and a heat discharge amount from an engagement torque and a slip engagement time of the clutch.

If the clutch is released, the engine is controlled through feedback control etc., such that the rotation speed of the engine becomes equal to a synchronization rotation speed (an engine rotation speed at which the clutch is synchronized) to synchronize the rotation speeds before and after the clutch, or both the rotation speed of the engine and the rotation speed on the power transmission path side may be controlled as in the second aspect of the invention. If the engine and the rotator are directly coupled via the clutch, the control may be provided such that the rotation speeds thereof are substantially matched and, for example, the engine may be controlled by using the actual rotation speed of the rotator as the target rotation speed of the engine. The present invention is applicable even when reduction gears etc. are interposed between the engine and the rotator along with the clutch and, even in such a case, the same effect as the second aspect of the invention is acquired by performing a shifting in a shifting portion disposed in a power transmission path such that the clutch is synchronized when the engine is operated at an idle rotation speed.

For example, an automatic transmission interposed in the power transmission path can be used as a shifting portion of the second aspect of the invention, and the rotation speed on the power transmission path side of the clutch can be changed to the idle rotation speed through the shift control of the automatic transmission. If a fluid power transmission device with a lockup clutch is included, the lockup clutch can be used as the shifting portion to change the rotation speed on the power transmission path side of the clutch through the slip control of the lockup clutch. The synchronization may be achieved at a rotation speed other than the idle rotation speed in the implementation of the other aspects of the invention.

Although the synchronization of the rotation speeds before and after the clutch means providing control such that the rotation speeds are substantially matched, rotation variations may be included due to pulsation of engine rotation or hunting of control, and a rotation speed difference of about a few tens of rpm may be included due to an error in control etc.

Example

An example of the present invention will now be described in detail with reference to the drawings.

FIG. 1 is a diagram of a general configuration including a schematic of a drive system of a hybrid vehicle 10 to which the present invention is preferably applied. The hybrid vehicle 10 includes an engine 12 that is an internal combustion engine such as a gasoline engine and a diesel engine generating power from combustion of fuel, and a motor generator MG acting as an electric motor and an electric generator, as drive force sources. The output of the engine 12 and the motor generator MG is transmitted from a torque converter 14 that is a fluid power transmission device via a turbine shaft 16 and a C1 clutch 18 to an automatic transmission 20 and further transmitted via an output shaft 22 and a differential gear device 24 to left and right drive wheels 26. The torque converter 14 includes a lockup clutch (L/U clutch) 30 directly coupling a pump impeller to a turbine impeller, and the pump impeller is integrally connected to an oil pump 32 and is mechanically rotationally driven by the engine 12 and the motor generator MG to generate and supply an oil pressure to a hydraulic control device 28. The lockup clutch 30 is engaged or released by an electromagnetic hydraulic control valve, a switching valve, etc. disposed in the hydraulic control device 28 and can be engaged in a predetermined slip state through hydraulic control. The motor generator MG corresponds to a rotator.

The engine 12 includes an idle rotation speed control device 36 such as an idle rotation speed control valve (ISC valve) capable of controlling an idle rotation speed $NEidl$ in a range from the lowest idle rotation speed $NEidl1$ to the highest idle rotation speed $NEidl2$. A K0 clutch 34 is disposed between, and directly couples, the engine 12 and the motor generator MG. The K0 clutch 34 is a dry or wet friction clutch frictionally engaged by a hydraulic cylinder. The K0 clutch 34 is a hydraulic friction engagement device and acts as a connecting/disconnecting device connecting and disconnecting the engine 12 to/from a power transmission path. The K0 clutch 34 is also engaged or released by a hydraulic control valve, a switching valve, etc. disposed in the hydraulic control device 28 and can be engaged in a predetermined slip state through hydraulic control.

The motor generator MG is connected via an inverter 42 to a battery 44. The automatic transmission 20 is a stepped automatic transmission of planetary gear type etc., having a plurality of gear stages with different gear ratios established depending on engaged/released states of a plurality of hydraulic friction engagement devices (clutches and brakes) and is subjected to shift control by electromagnetic hydraulic control valves, switching valves, etc., disposed in the hydraulic control device 28. The C1 clutch 18 acts as an input clutch of the automatic transmission 20 and is also subjected to the engagement/release control by the hydraulic control device 28. A belt type continuously variable transmission can be used as the automatic transmission 20.

The hybrid vehicle 10 includes an electronic control device 70. The electronic control device 70 includes a so-called microcomputer having a CPU, a ROM, a RAM, an I/O interface, etc., to execute signal processes in accordance with a program stored in advance in the ROM, while utilizing a temporary storage function of the RAM. The electronic control device 70 is supplied with signals indicative of a rotation speed (engine rotation speed) NE of the engine 12, a rotation speed (MG rotation speed) NMG of the motor generator MG, an operation amount (accelerator operation amount) Acc of an accelerator pedal, a rotation speed (output shaft rotation speed corresponding to the vehicle speed V) NOUT of the output shaft 22, and a temperature (clutch temperature) TK0 of the K0 clutch 34, from an engine rotation speed sensor 50, an MG rotation speed sensor 52, an accelerator operation amount sensor 54, a vehicle speed sensor 56, and a clutch temperature sensor 58, respectively. Various pieces of information necessary for various types of control are also supplied. Although the clutch temperature sensor 58 detects, for example, the temperature of the K0 clutch 34 itself, the temperature can be obtained by calculation from an engagement torque (oil pressure), an engagement time, etc. or, if the K0 clutch 34 is a wet clutch, a temperature of a cooling medium may be detected. The accelerator operation amount Acc corresponds to a demanded drive force by a driver.

The electronic control device 70 functionally includes a hybrid control means 72, a shift control means 74, and an engine running switching means 80. The hybrid control means 72 controls the operations of the engine 12 and the motor generator MG to switch a plurality of predefined running modes, for example, an engine running mode using the engine 12 as the drive force source for running and a motor running mode using the motor generator MG as the drive force source for running, depending on an operation state such as the accelerator operation amount Acc and the vehicle speed V during running FIG. 2 is a diagram for explaining the engine running mode and the motor running mode and, in the engine running mode, the K0 clutch 34 is engaged (○) to connect the engine 12 to the power transmission path and the engine 12 is operated (○). The motor generator MG is subjected to power running control for an assist as needed during acceleration etc. In the motor running mode, the K0 clutch 34 is released (x) to separate the engine 12 from the power transmission path and the operation of the engine 12 is stopped (x) so that the motor generator MG is subjected to power running control (○) for running depending on the accelerator operation amount Acc. In the motor running mode, the motor generator MG is subjected to regeneration control under a certain condition to charge the battery 44 during inertia running at the accelerator operation amount Acc of zero (accelerator-OFF).

The shift control means 74 controls the electromagnetic hydraulic control valves, switching valves, etc. disposed in the hydraulic control device 28 to switch the engaged/released states of the plurality of the hydraulic friction engagement devices, thereby switching a plurality of the gear stages of the automatic transmission 20 in accordance with a shift map defined in advance by using an operation state such as the accelerator operation amount Acc and the vehicle speed V as a parameter.

Figure 3:
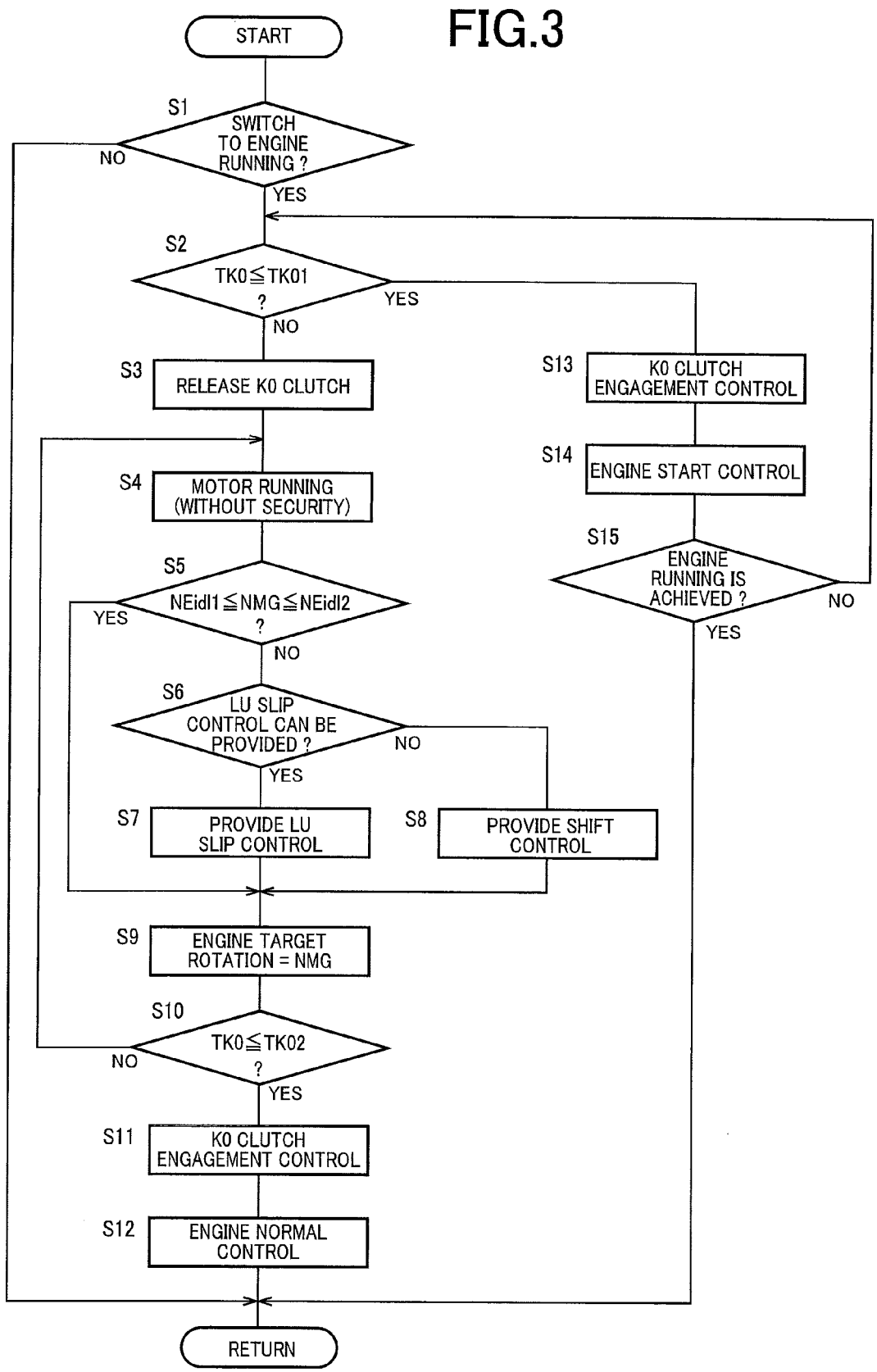
FIG. 3 is a flowchart for specifically explaining switching control to the engine running mode provided by an engine running switching means of FIG. 1.

If the hybrid control means 72 makes a determination of switching to the engine running mode because of an increase in the accelerator operation amount Acc of a driver or the vehicle speed V etc. during running in the motor running mode, the engine running switching means 80 puts the K0 clutch 34 into the slip engagement to crank and start the engine 12 and completely engages the K0 clutch 34 after the start of the engine for switching to the engine running mode. The engine running switching means 80 also has a function of, if the K0 clutch 34 reaches the thermal limitation, forcibly releasing the K0 clutch 34 to prevent damage of the friction material etc., providing synchronization control for synchronizing the rotation speeds before and after the K0 clutch 34, and engaging the K0 clutch 34 without torque compensation after a drop in the clutch temperature so as to make a shift to the engine running mode. In particular, the engine running switching means 80 functionally includes a clutch engagement control means 82, an engine start control means 84, and a synchronization control means 86 and provides engine running switching control in accordance with a flowchart of FIG. 3. FIG. 3 includes steps S2, S3, S10, S11, and S13 corresponding to the clutch engagement control means 82, step S14 corresponding to the engine start control means 84, and steps S5 to S9 corresponding to the synchronization control means 86.

At step S1 of FIG. 3, it is determined whether the hybrid control means 72 makes a determination of switching to the engine running mode and, if a determination of switching is made, the step S2 and later are executed. At the step S2, it is determined whether the clutch temperature TK0 is equal to or less than a predefined engagement inhibition temperature TK01 and, if TK0≤TK01 is satisfied, the step S13 and later are executed to provide the switching control to the engine running mode. The K0 clutch 34 is slip-engaged at the step S13 to crank the engine 12 and the fuel supply control and the ignition timing control are provided at the step S14 to start the engine 12. After the engine 12 is started, the K0 clutch 34 is completely engaged to terminate the shift to the engine running mode. At step S15, it is determined whether the K0 clutch 34 is completely engaged to terminate the shift to the engine running mode, and the steps S2, S13, and S14 are repeatedly executed until the shift is terminated. If the shift is terminated and the determination of the step S15 becomes YES (affirmative), a sequence of the engine running switching control is terminated.

On the other hand, when the K0 clutch 34 is slip-engaged to crank the engine 12 in this way, the clutch temperature TK0 may be increased by heat generation due to friction, resulting in damage of the friction material etc. due to overheating. The engagement inhibition temperature TK01 of the step S2 corresponds to the thermal limitation of avoiding the damage of the friction material of the K0 clutch 34 due to overheating and, if the clutch temperature TK0 exceeds the engagement inhibition temperature TK01 (K0 heat failure), the determination of the step S2 becomes NO (negative) and the step S3 is executed. At the step S3, the slip engagement of the K0 clutch 34 is inhibited and the K0 clutch 34 is forcibly released. As a result, a further increase in temperature is prevented in the K0 clutch 34 and the clutch temperature TK0 gradually drops due to heat discharge. Although the running by the motor generator MG is continued at step S4, it is not necessary in this example to secure a compensation torque Tα for preventing the shock due to inertia of the engine 12 when the K0 clutch 34 is engaged at the step S11 and the motor generator MG can be used up to the maximum torque TMGmax for running.

At the next step S5, it is determined whether the MG rotation speed NMG, i.e., the rotation speed on the power transmission path side of the K0 clutch 34 is within a range of the lowest idle rotation speed NEidl1 to the highest idle rotation speed NEidl2 of the engine 12 and, if the rotation speed is within this range, the step S9 is immediately executed. At the step S9, the MG rotation speed NMG at this point is set as a target rotation speed NEt of the engine 12 to provide control such that the engine rotation speed NE becomes equal to the target rotation speed NEt (=NMG) or, in other words, such that the rotation speeds before and after the K0 clutch 34 are synchronized (substantially matched), through the feedback control of the idle rotation speed control device 36 etc.

On the other hand, if the determination of the step S5 is NO (negative), i.e., if the MG rotation speed NMG is not within the range of the idle rotation speed between NEidl1 and NEidl2, the step S6 is executed to determine whether the MG rotation speed NMG can be changed into the range of the idle rotation speed between NEidl1 and NEidl2 by the slip control of the lockup clutch 30. In particular, if the lockup clutch 30 is in the completely engaged state, the MG rotation speed NMG can be increased (raised) to some extent with the torque of the motor generator MG by reducing an oil pressure to cause the lockup clutch 30 to slip and, if the lockup clutch 30 is in the released state, the MG rotation speed NMG can be reduced (lowered) until matching with a turbine rotation speed NT by increasing an oil pressure to cause the lockup clutch 30 to slip. If the MG rotation speed NMG can be changed into the range of the idle rotation speed between NEidl1 and NEidl2 by the slip control of the lockup clutch 30, the step S7 is executed to slip the lockup clutch 30 to change the MG rotation speed NMG into the range of the idle rotation speed between NEidl1 and NEidl2. The lockup clutch 30 corresponds to a shifting portion changing the rotation speed on the power transmission path side of the K0 clutch 34 (the MG rotation speed NMG) for synchronization.

If the determination of the step S6 is NO, i.e., if the MG rotation speed NMG cannot be changed into the range of the idle rotation speed between NEidl1 and NEidl2 by the slip control of the lockup clutch 30, the step S8 is executed. At the step S8, the gear stage of the automatic transmission 20 is switched such that the MG rotation speed NMG falls within the range of the idle rotation speed between NEidl1 and NEidl2. The automatic transmission 20 corresponds to the shifting portion changing the rotation speed on the power transmission path side of the K0 clutch 34 (the MG rotation speed NMG) for synchronization.

After the MG rotation speed NMG is changed to fall within the range of the idle rotation speed between NEidl1 and NEidl2 at the step S7 or S8, the step S9 is executed to set the target rotation speed NEt of the engine 12 to the MG rotation speed NMG at this point and the idle rotation speed control of the engine 12 is provided.

At the next step S10, it is determined whether the clutch temperature TK0 drops to a predefined engagement inhibition cancelation temperature TK02 or less and, although the step S4 and later are repeated while the clutch temperature TK0 is higher than the engagement inhibition cancelation temperature TK02, the step S11 and later are executed if TK0≤TK02 is satisfied. At the step S11, the K0 clutch 34 is promptly completely engaged to make the shift to the engine running mode and, at the step S12, the rotation speed control of the engine 12 is canceled to provide the normal engine output control generating a drive force corresponding to the accelerator operation amount Acc. Since the rotation speeds (NE and NMG) before and after the K0 clutch 34 are synchronized in this example, the shock due to the inertia of the engine 12 is substantially eliminated when the K0 clutch 34 is completely engaged at the step S11 so that the torque compensation by the motor generator MG is not required and, therefore, it is not necessary to secure the compensation torque Tα during the motor running at the step S4. The engagement inhibition cancelation temperature TK02 is such a temperature that, when the engagement control of the K0 clutch 34 is provided to resume the shift to the engine running mode, the shift can be completed before the clutch temperature TK0 reaches the engagement inhibition temperature TK01, and is set to a temperature sufficiently lower than the engagement inhibition temperature TK01.

The synchronization control of the steps S5 to S9 is based on the assumption that the engine 12 is already in the self-sustaining rotation when the determination of the step S2 becomes NO and, if the self-sustaining rotation cannot be performed and the rotation of the engine 12 is stopped, the steps S13 to S15 are executed to provide the switching control to the engine running mode after the temperature of the K0 clutch 34 becomes equal to or less than the engagement inhibition cancelation temperature TK02 without providing the synchronization control of the steps S5 to S9.

FIG. 4 is an example of a time chart in the case that, when the accelerator pedal is subjected to a depression operation during the inertia running at accelerator-OFF, i.e., the accelerator operation amount Acc=0, and the motor running mode is switched to the engine running mode in accordance with the flowchart of FIG. 3, the k0 clutch 34 is released due to a heat failure before the shift to the engine running mode is performed through the synchronization control. Time t1 is a time when the accelerator pedal is subjected to a depression operation during the inertia running at accelerator-OFF, and the torque (MG torque) TMG of the motor generator MG is immediately raised while the determination of the step S1 becomes YES (affirmative) in accordance with the switching determination of switching from the motor running mode to the engine running mode, leading to the start of execution of the step S2 and later. Since the steps S13 to S15 are initially executed at the clutch temperature TK0 equal to or less than the engagement inhibition temperature TK01, the MG torque TMG is limited to a torque reduced from the maximum torque TMGmax by the compensation torque Tα in preparation for the slip engagement of the K0 clutch 34 during running. When the slip engagement of the K0 clutch 34 is started (time t2), the MG torque TMG is increased by the compensation torque Tα to cancel out the shock due to the inertia of the engine 12 and is set to the maximum torque TMGmax. When the K0 clutch 34 is slip-engaged in this way, the engine 12 is cranked to increase the engine rotation speed NE and the clutch temperature TK0 is increased by heat generation due to friction. A "K0 oil pressure command value" on the lowermost part of FIG. 4 is a command value of an oil pressure for engaging the K0 clutch 34, and the actual oil pressure corresponding to the transmission torque increases after a cylinder is filled (at time t2), so that the engine 12 is cranked based on the transmission torque (slip engagement). The K0 oil pressure command value being 0 means that the K0 clutch 34 is in a released state.

Time t3 is a time when the clutch temperature TK0 exceeds the engagement inhibition temperature TK01 because of the heat generation due to the slip engagement of the K0 clutch 34 and the determination of the step S2 becomes NO so that the execution of steps after the step S3 is started. Therefore, the K0 clutch 34 is immediately forcibly released and the drive force is generated by the motor generator MG for running while the synchronization control is started to substantially match the rotation speeds before and after the K0 clutch 34. Since it is not necessary to secure the compensation torque Tα, the motor generator MG is used up to the maximum torque TMGmax for running. In the synchronization control, the step S9 is immediately executed when the MG rotation speed NMG, i.e., the rotation speed on the power transmission path side of the K0 clutch 34, is within the range of the idle rotation speed between NEidl1 and NEidl2, and the MG rotation speed NMG at this point is set as the target rotation speed NEt of the engine 12 to provide the idle rotation speed control of the engine 12. As a result, the engine rotation speed NE is substantially matched with the MG rotation speed NMG within the range of the idle rotation speed between NEidl1 and NEidl2.

When the clutch temperature TK0 is reduced by the forcible release of the K0 clutch 34 to the engagement inhibition cancelation temperature TK02 or less (time t4), the engagement control of the K0 clutch 34 is resumed at the step S11 to make the shift to the engine running mode. In this case, since the rotation speeds (NE and NMG) before and after the K0 clutch 34 are synchronized, the K0 clutch 34 can promptly completely be engaged without the shock due to the inertia of the engine 12 even without the torque compensation by the motor generator MG. Time t5 is a time when the K0 clutch 34 is completely engaged and the engine running mode is achieved.

On the other hand, if the synchronization control is not provided, since a rotation speed difference exists between the engine rotation speed NE and the MG rotation speed NMG at the time of the forcible release of the K0 clutch 34 due to the K0 heat failure as indicated by a dashed-two dotted line of FIG. 4, the engine rotation speed NE must be raised when the clutch temperature TK0 becomes equal to or less than the engagement inhibition cancelation temperature TK02 and the K0 clutch 34 is subjected to the engagement control, resulting in a shock (a drop in drive force) due to the inertia of the engine 12. Although the torque compensation by the motor generator MG is required for preventing the shock, the MG torque TMG must be limited by the compensation torque Tα as shown with the dashed-two dotted line for the MG torque TMG in preparation for the clutch engagement after the temperature drop during running. Therefore, a sufficient drive force cannot be acquired and a driver may have a feeling of strangeness because of an insufficient drive force.

As described above, when the clutch temperature TK0 of the K0 clutch 34 exceeds the engagement inhibition temperature TK01 that is the thermal limitation and the K0 clutch 34 is forcibly released at the time of switching to the engine running mode (the step S3), the hybrid vehicle 10 of this example has the engine rotation speed NE controlled such that the rotation speeds (NE and NMG) before and after the K0 clutch 34 are synchronized (the steps S5 to S9) and, therefore, the shock (drive force variation) is reduced when the K0 clutch 34 is engaged for the shift to the engine running mode after the temperature drop. This eliminates the need for the torque compensation at the time of clutch engagement and, when the drive force is generated by the motor generator MG for running at the time of the K0 heat failure (the step S4), it is not necessary to secure the compensation torque Tα so that the motor generator MG can be used up to the maximum torque TMGmax for running, and a driver is prevented from having a feeling of strangeness because of an insufficient drive force. Therefore, the drive force can be generated by the torque larger by the compensation torque Tα for running as compared to the case without the synchronization control.

Since the engine 12 and the motor generator MG are directly coupled via the K0 clutch 34 and the slip control of the lockup clutch 30 and the shift control of the automatic transmission 20 are provided as needed such that the MG rotation speed NMG falls within the range of the idle rotation speed between NEidl1 and NEidl2 of the engine 12 while the rotation speed control of the engine 12 is provided such that the target rotation speed NEt is the MG rotation speed NMG in this example, the engine rotation speed NE can highly accurately and steadily be controlled by the idle rotation speed control device 36 etc., and the shock at the time of engagement of the K0 clutch 34 can properly be reduced.

Although the example of the present invention has been described in detail with reference to the drawings, this is merely an embodiment and the present invention can be implemented in variously modified and improved forms based on the knowledge of those skilled in the art.

NOMENCLATURE OF ELEMENTS

10: hybrid vehicle 12: engine 20: automatic transmission (shifting portion) 30: lockup clutch (shifting portion) 34: K0 clutch (clutch) 58: clutch temperature sensor 70: electronic control device 80: engine running switching means 82: clutch engagement control means 84: engine start control means 86: synchronization control means MG: motor generator (rotator) TK0: clutch temperature TK01: engagement inhibition temperature (predefined value) NE: engine rotation speed NMG: MG rotation speed (rotation speed on a power transmission path side) NEidl1: lowest idle rotation speed NEidl2: highest idle rotation speed

The invention claimed is:

1. A control device of a hybrid vehicle, the hybrid vehicle including an engine connected via a clutch to a power transmission path and a rotator acting at least as an electric motor, the control device comprising:
    a hybrid control portion configured to execute an engine running mode, in which the clutch is engaged to use at least the engine as a drive force source for running the hybrid vehicle, and a motor running mode, in which the clutch is released to use the rotator as the drive force source for running the hybrid vehicle; and
    an engine running switching portion configured to put the clutch into slip engagement, to crank and start the engine, at the time of switching to the engine running mode when the engine is stopped,
    wherein the engine running switching portion includes a synchronization control portion configured to, when a clutch temperature reaches a predefined value at the time of switching to the engine running mode, release the clutch and cause the rotator to generate a drive force for running while controlling a rotation speed of the engine to synchronize rotation speeds before and after the clutch.

2. The control device of a hybrid vehicle of claim 1, wherein:
    the engine is directly coupled via the clutch to the rotator, and
    to synchronize the rotation speeds before and after the clutch, the synchronization control portion is configured to perform a shifting in a shifting portion, disposed in the power transmission path, to make a rotation speed of the rotator that is a rotation speed on the power transmission path side of the clutch equal to an idle rotation speed of the engine while the engine is controlled such that a target rotation speed of the engine is the rotation speed of the rotator after the shifting.

* * * * *